(12) United States Patent
Alberty

(10) Patent No.: US 6,304,616 B1
(45) Date of Patent: Oct. 16, 2001

(54) METHOD FOR RECEPTION OF CODED DATA BY A RECEIVER

(75) Inventor: Thomas Alberty, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/011,244

(22) PCT Filed: Apr. 18, 1996

(86) PCT No.: PCT/DE96/00679

§ 371 Date: Jan. 30, 1998

§ 102(e) Date: Jan. 30, 1998

(87) PCT Pub. No.: WO97/07595

PCT Pub. Date: Feb. 27, 1997

(30) Foreign Application Priority Data

Aug. 16, 1995 (DE) ............................................. 195 29 983

(51) Int. Cl.[7] .................................................. H03D 1/00
(52) U.S. Cl. ........................ 375/340; 375/341; 375/262; 375/265
(58) Field of Search .................................... 375/340, 341, 375/262, 265; 714/795, 796, 794, 792

(56) References Cited

U.S. PATENT DOCUMENTS

| | | | |
|---|---|---|---|
| 5,031,195 | * 7/1991 | Chevillat et al. | 375/14 |
| 5,541,955 | * 7/1996 | Jacobsmeyer | 375/222 |
| 5,633,881 | * 5/1997 | Zehavi et al. | 371/37.5 |
| 5,862,156 | * 1/1999 | Huszar et al. | 371/43.7 |

FOREIGN PATENT DOCUMENTS 93 01 170 U1 7/1994 (DE) .

OTHER PUBLICATIONS

Magee, F., Proakis, J.: "Adaptive Maximum–Likelihood Sequence . . . ", IEEE Transactions On Information Theory, Jan. 1973, pp. 120–124.

Kamel, R., Bar–Ness, Y.:Reduced–State Sequence Estimation . . . , Electronics Letters, Jan. 6, 1994, vol. 30, No. 1, pp. 14–16.

Battail, G.: "Ponderation Des Symboles Decodes Par . . . ", Ann. Telecommun., 42, 1987, pp. 31–38.

Hagenauer, J., Hoeher, P.: "A Voterbi Algorithm With Soft–Decision . . . ", Proceedings of the Globecom Conference, 1989, p. 47.1.1–47.1.7.

* cited by examiner

Primary Examiner—Mohammad H. Ghayour
(74) Attorney, Agent, or Firm—Michael J. Striker

(57) ABSTRACT

The method of receiving a coded data signal encoded by means of a state transition diagram having a number of states (U, V, W, X) by a receiver, the receiver including a demodulator that generates estimated symbols ($c'_i$) from the data signal and a following data decoder, includes forming a number (N) of groups (a,b) from the states (U, V, W, X) of the state transition diagram; continuously making estimations of probabilities of group membership of a current state of the data decoder (Dd) in the groups (a,b); furnishing the estimations to the demodulator as assisting signals and generating the estimated symbols ($c'_i$) using them. In another embodiment, a number (K) of groups (I,II) are formed from channel symbols of a channel symbol alphabet, estimates of probabilities of group membership of received symbols are continuously made, the estimates are supplied to the demodulator (Dd) as assisting signals and the estimated symbols ($c'_i$) are generated from them.

17 Claims, 5 Drawing Sheets

METHOD FOR RECEPTION OF CODED DATA BY A RECEIVER

BACKGROUND OF THE INVENTION

1. Field of the Invention

The present invention relates to methods of reception of a coded data signal by a receiver and, more particularly, to methods for producing and providing assisting signals to a demodulator in the receiver to improve decoding of the received coded data signal.

2. Description of Related Art

In data signal transmission, coding is often employed, for instance to enable reducing the required transmission energy per data bit for the same error rate. The main task of a data decoder downstream of a demodulator in the receiver is to determine a train of data bits $d'_k$ from the train of estimated values $c'_i$, possibly provided with quality standards, for the channel symbols $c_i$ actually sent, so that the error probabilities of these data bits $d'_k$, referred to the actual data bits $d_k$ of the source, are as low as possible.

One example of such a decoder is the one described in reference 1 (paper by Forney, "The Viterbi Algorithm", Proceedings of the IEEE, Volume 61, No. 3, March 1973, pages 268–278), which is also known as a Viterbi decoder.

A second task of the data decoder can be to support the demodulator in determining the estimated values $c'_i$ from the received signal r(t). One example of such support is described in reference 2 (paper by Ungerboeck, "Channel Coding with Multilevel/Phase Signals"), IEEE IT-28, No. 1, January 1982, pages 55–67, especially FIG. 17). In addition to the train of data bits $d'_k$, the data decoder determines a train of improved estimated values $c''_i$ for the channel symbols, but this train is delayed compared to the train of estimated values $c'_i$ furnished by the demodulator. The estimated values for the channel symbols furnished by the channel symbols are also known as tentative decisions. The feedback of the estimated values $c''_i$ to the demodulator, however, creates a closed-loop control circuit, or control loop, in which the aforementioned delay is problematic. The feedback also creates problems in the initial synchronization, because the closed-loop control circuit under some circumstances can remain for relatively long periods in unstable states of equilibrium, known as "false locks".

BRIEF SUMMARY OF THE INVENTION

It is an object of the present invention to provide improved methods of receiving a coded data signal by a receiver including a demodulator followed by a data decoder, which does not have the above-described disadvantages.

According to the invention the method of reception of a coded data signal by the receiver, the data signal being encoded by means of a channel symbol alphabet having M stages, the receiver including a demodulator that generates estimated symbols from the coded data signal and a data decoder following the demodulator, comprises the steps of:

a) forming a number of groups from channel symbols of the channel symbol alphabet, at least one of the groups comprising more than one channel symbol;

b) continuously making estimations of probabilities of group membership of received symbols in the respective groups;

c) furnishing these estimations of probabilities of group membership to the demodulator in the form of assisting signals; and d) generating the estimated symbols with the help of the assisting signals.

Alternatively, according to the invention the method of reception of a coded data signal by the receiver, the data signal being encoded by means of a state transition diagram including a number of states, the receiver including a demodulator that generates estimated symbols from the coded data signal and a data decoder following the demodulator, comprises the steps of:

a) forming a number of groups from the states of the state transition diagram;

b) continuously making estimations of probabilities of group membership of a current state of the data decoder in the respective groups;

c) furnishing these estimations of probabilities of group membership to the demodulator in the form of assisting signals; and d) generating the estimated symbols with the help of the assisting signals.

With these methods according to the invention, it is possible to keep the length of the delay in the resultant control loop of the demodulator and data decoder as short as possible. Fast initial synchronization is also attained.

The invention is based on the recognition that estimated values for the channel symbols are not absolutely necessary for the support of the demodulator. In the parallel patent application entitled "Verfahren zur Synchronisation" [Method for Synchronization], filed on the same date as the present application and by the same Applicant, it is shown that even estimated values for the membership in a channel symbol group can be used to support the demodulator. The feedback of estimated values for the membership in a channel symbol group, instead of for the channel symbols, according to the present invention has the following advantages: These estimated values can be determined with a shorter delay time, thus rendering the problems of the control loop transit time less critical. There are fewer channel symbol groups than channel symbols, so there are fewer unstable equilibrium states and therefore the initial synchronization is improved. Moreover, the decision regarding a group membership is easier and thus takes less effort. In addition, this makes the interface between the data decoder and the demodulator simpler and thus less complicated.

BRIEF DESCRIPTION OF THE DRAWING

The description of a simple exemplary embodiment of the invention follows, in conjunction with the drawings.

DETAILED DESCRIPTION OF THE INVENTION

Figure 1:
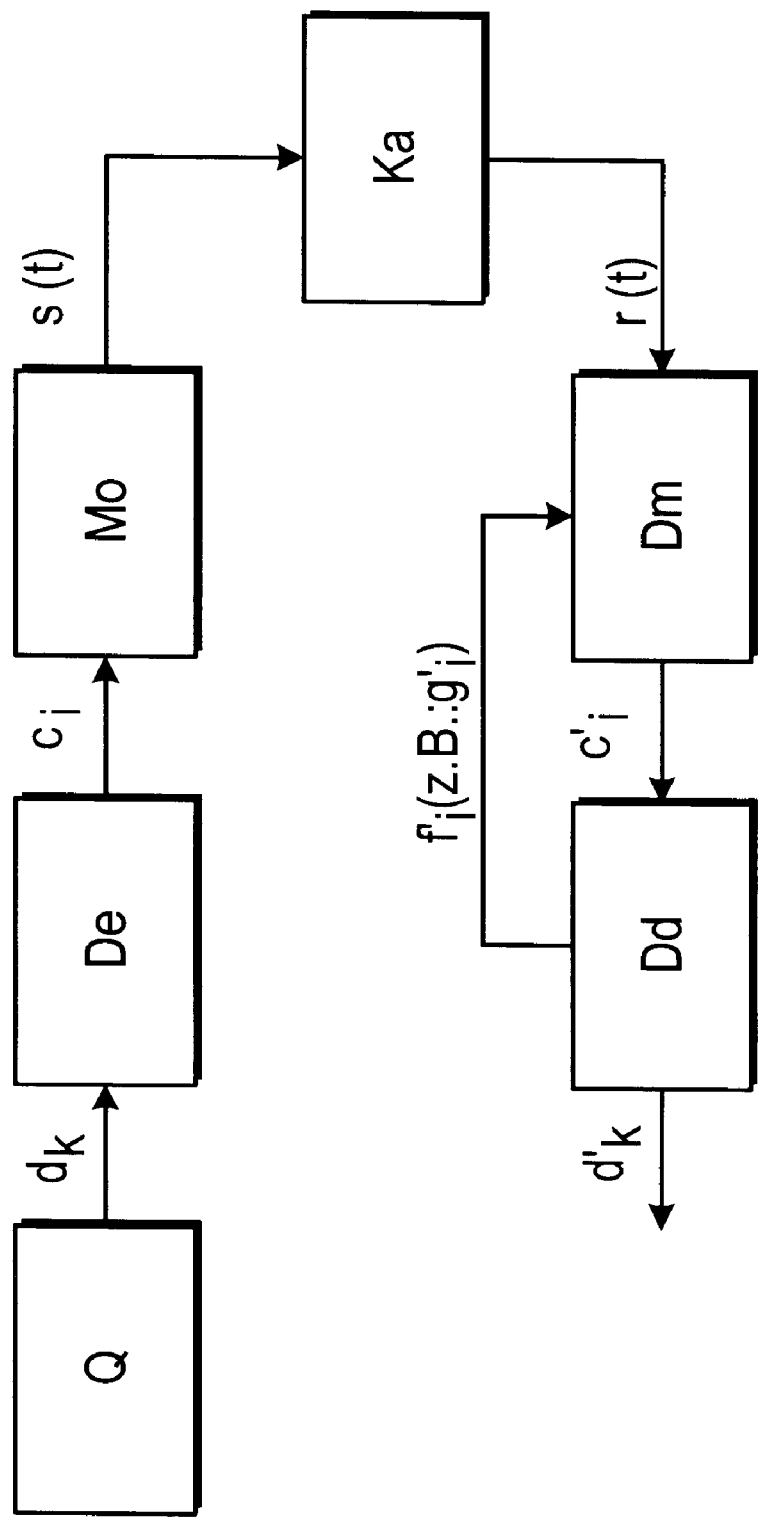
FIG. 1 shows a basic circuit diagram of a transmission system.
Figure 2:
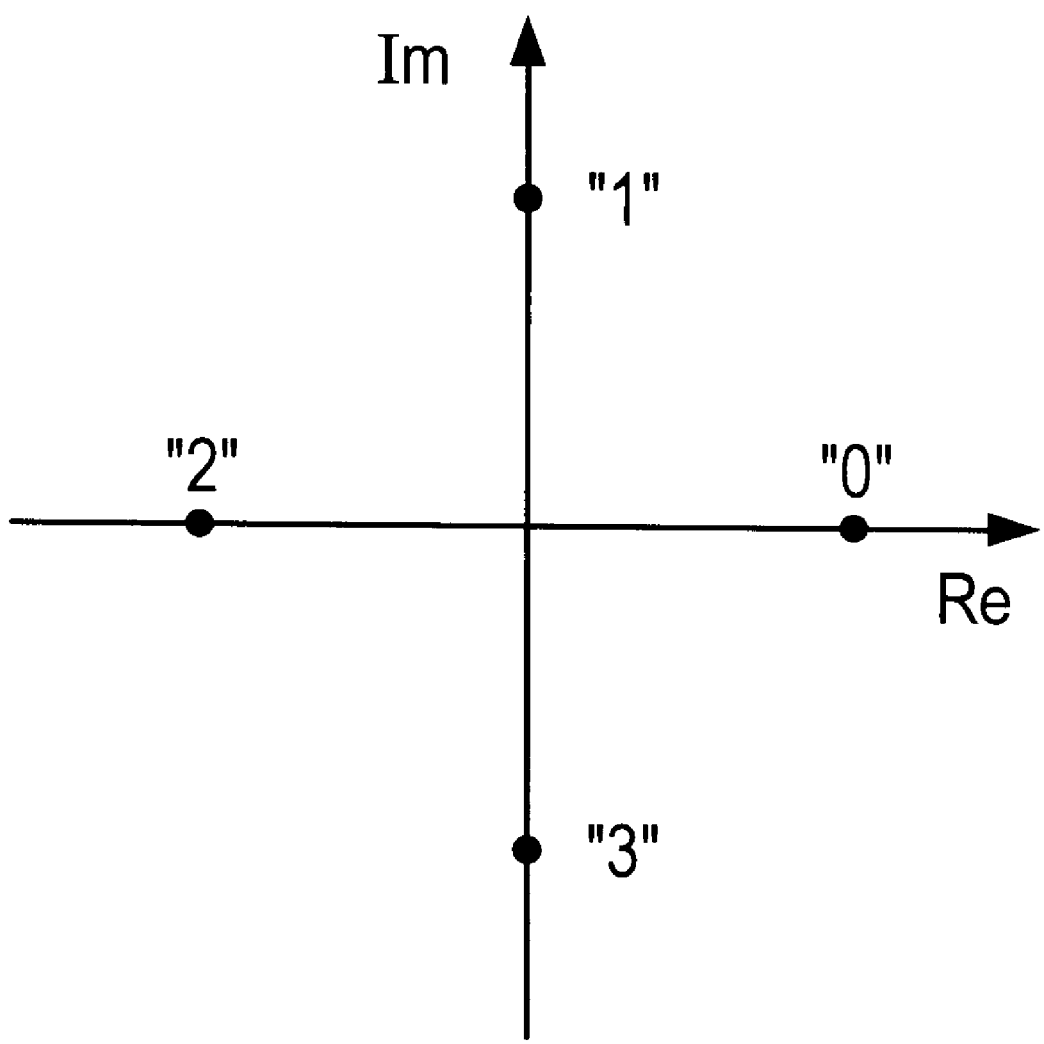
FIG. 2 illustrates the location of the channel symbols in QPSK modulation.

In FIG. 1, a source Q generates a train of data bits $d_k$, which is delivered to a data encoder De. The data encoder generates a train of channel symbols $c_i$, which is delivered to a modulator Mo. If the transmission is based on a QPSK modulation, for instance, then the channel symbols $c_i$ are elements of a four-stage channel symbol alphabet; that is, $c_i$ is one element in the set (1j, −1, −j), in which i is the imaginary unit. These four possible channel symbols are represented in FIG. 2 as points in the complex plane. Finally, the modulator Mo generates the actual transmission signal s(t) for transmission over the channel Ka.

In the receiver, the received signal r(t) is delivered to a demodulator Dm. The demodulator furnishes the train of estimated values $c'_i$ for the channel symbols (optionally provided with quality standards), which are delivered to a data decoder Dd. The data decoder, finally, determines the train of estimated data bits $d'_k$. It also furnishes a train of values $f'_i$, which are delivered to the demodulator Dm. In the method disclosed in reference 2, $f'_i$ would be a train of improved estimated values, $c''_i$ for the channel symbols, while in a method according to the invention $f'_i$ is a train of estimated values $g'_i$ for the membership in a channel symbol group, possibly provided with corresponding quality standards.

Figure 3:
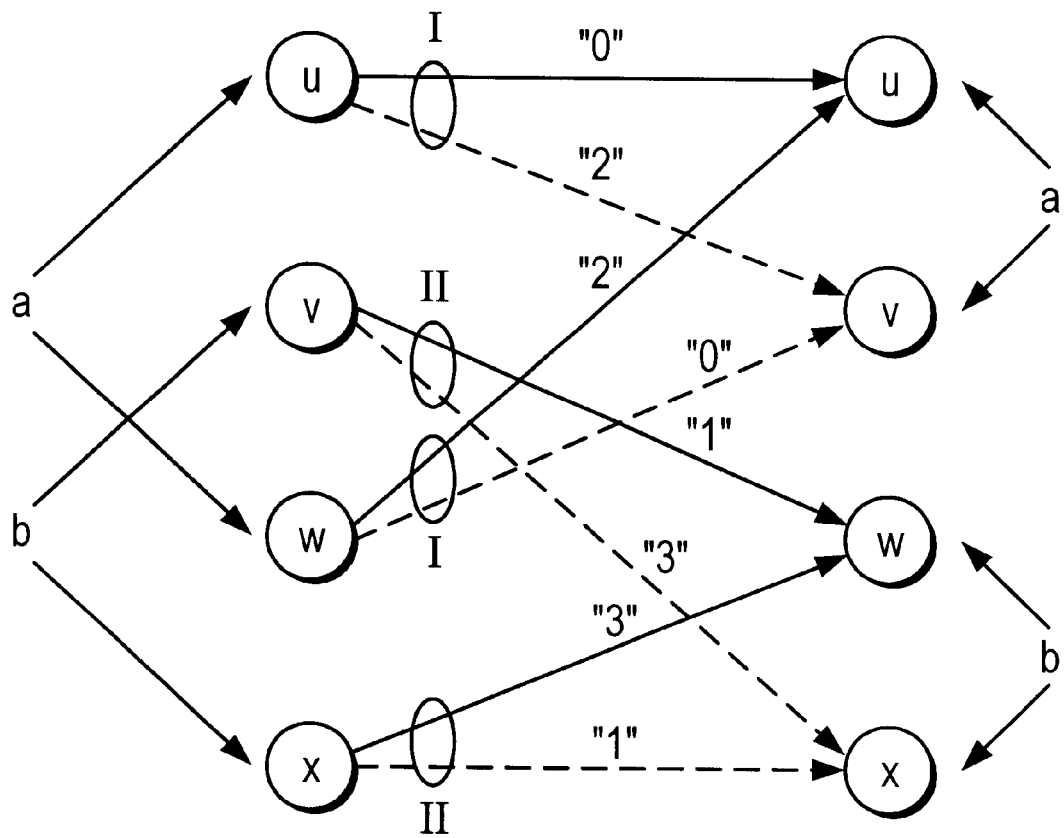
FIG. 3 shows a state transition diagram of the coding, also known as a trellis diagram.

To illustrate the principle of determining the estimated values for the group membership, FIG. 3 shows a simple state transition diagram for a convolution code with a rate of ½ in QPSK. At each time, the data encoder De is in one of the four states U, V, W, X represented by circles. If the data encoder De receives the next data bit $d_k$ from the source Q, then when $d_k=0$ it takes the path indicated by the solid-line arrow, while when $d_k=1$ it takes the path indicated by the dashed-line arrow. This accordingly defines the transition to the next state. The numbers on each of the arrows each define the next channel symbol, which is delivered to the modulator Mo. The data decoder Dd in the receiver is likewise based on this state transition diagram. Determining the train $d'_k$ is then equivalent to determining the most probable path through the state transition diagram. To that end, the data decoder Dd at each time i for each state z determines a so-called path metric $p_{z,i}$, which represents a standard for the probability that the path at time i runs through this state z (i=0, 1, 2, 3, . . . ). With the aid of the estimated value $c'_{i+1}$ from the demodulator Dm, possibly including an associated quality standard, the data decoder Dd then determines the corresponding path metrics at time i+1. This procedure is described at length in reference 1. For describing the method on which the invention is based, the only significant aspects are that these path metrics $p_{z,i}$ exist, and that they are a standard for the probabilities of the states at time i.

From the state transition diagram it can be learned that only two channel symbols lead away from each state. If the channel symbol alphabet is divided into two channel symbol groups I and II, where channel symbol group I contains the two symbols "0" and "2" while channel symbol group II contains the two symbols "1" and "3", then only the channel symbols of one channel symbol group can lead away from each state. In other words, with the aid of the path metrics, at time i an estimated value can be derived for the group membership at time i+1. To that end, in the simplest case, only what at the moment is the most probable state is determined, and the associated designation of the channel symbol group that is capable of leading away from this state is sent on to the demodulator Dm. In the usual way in which path metrics are shown, the most probable state is designated by the minimal path metric, so that only the state having the minimal path metric needs to be determined.

Figure 4:
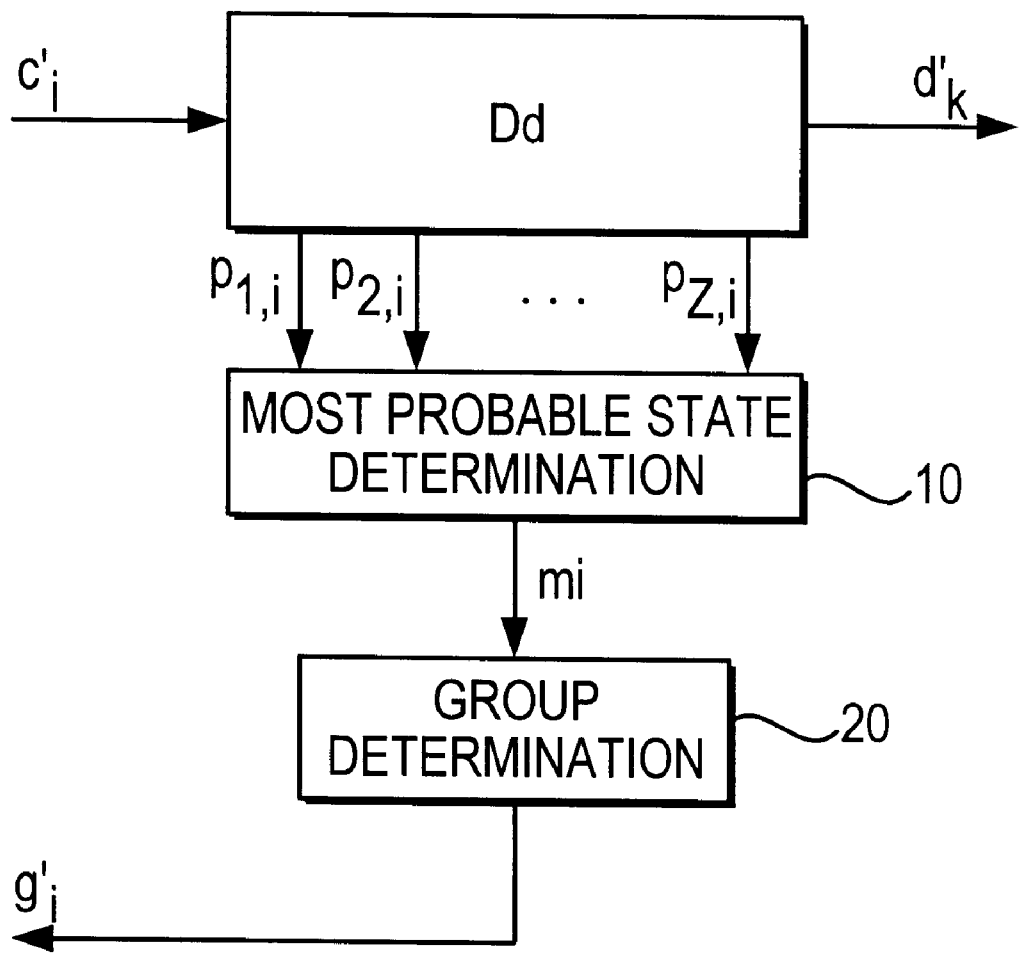
In FIG. 4, one possible realization for determining the estimated values for the membership in a channel symbol group is shown.

This principle is illustrated in FIG. 4. At each time i, the data decoder Dd furnishes the path metrics for all Z states, that is, $p_{1,i}, p_{2,i}, \ldots, P_{z,i}$, to the processing unit 10, which by comparison of the path metrics determines the ordinal number or other designation mi of the most probable state. For this state, the path metric $p_{mi,i}$ is less than or equal to all the other path metrics at the time i. Then the processing block 20 need merely determine only the designation of the associated channel symbol group $g'_i$ from mi. This can be done for instance in the form of a simple table, in which for each state the associated designation is entered.

Alternatively, the designation mi for the most probable state can naturally also be returned to the demodulator Dm, which then can determine the channel group on its own.

In another alternative, the processing unit 10 can determine a designation not of the most probable, but instead of the second most probable state or the least probable state, and output it to an alternative processing block 20, which from it forms suitable support signals $g'_i$; the processing block 20 can in turn be part of the demodulator Dm.

Figure 5:
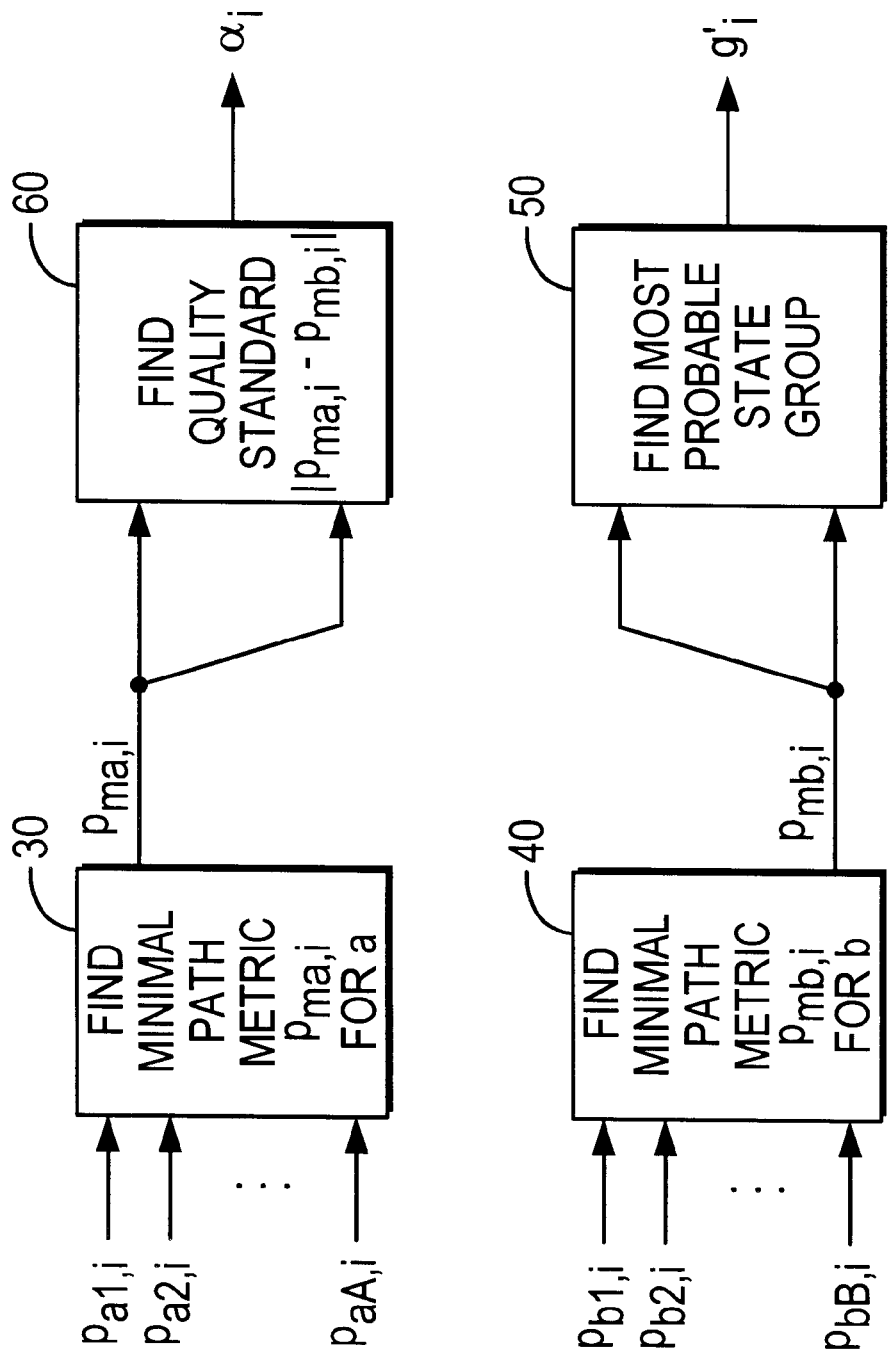
FIG. 5 shows another possible realization for determining the estimated values for the membership in a channel symbol group and the determination of an additional quality standard for these estimated values.

From the path metrics, however, a quality standard of the decision about the group membership can also be derived. An especially simple method is shown in FIG. 5 for the example of two channel symbol groups; an alternative method for determining the group membership is also indicated. To that end, the states are divided into state groups. As shown in the state transition diagram in FIG. 3, in this case the states U and W are assigned to a state group a, and the states V and X are assigned to a state group b. If state group a contains a total of A states, then the associated path metrics at time i should thereafter be designated by $P_{a1,i}, P_{a2,i}, \ldots, P_{aA,i}$. These path metrics are delivered to the processing block 30, which determines the minimal path metric $P_{ma,i}$ of this state group; that is, $P_{ma,i}=\min(P_{a1,i}, P_{a2,i}, \ldots, P_{aA,i})$. The processing block 40 performs accordingly with the path metrics $P_{b1,i}, P_{b2,i}, \ldots, P_{aB,i}$ of state group b at time i, the result being that the path metric $P_{mb,i}$ of the most probable state of state group b is obtained. To determine the most probable state group, all that the processing block 50 now need do is to compare these two path metrics with one another and output the corresponding designation $g'_i$ of the most probable state group. A standard for the quality of this decision is obtained for instance from the difference between the two path metrics $P_{ma,i}$ and $P_{mb,i}$ of the most probable states of the state groups a and b. The quality of the decision is all the better, the greater this difference is. In the simplest case, accordingly in the processing block 60 only the absolute amount of the difference between $P_{ma,i}$ and $P_{mb,i}$ is compared with a threshold. If it exceeds the threshold, then the estimated value is of high quality, and the quality standard $\alpha_i$, is set equal to "1", for example. If it fails to attain the threshold, then the estimated value is of poor quality, and the quality standard $\alpha_i$ is set equal to "0", for example.

If there are more than two state groups, then a simple quality standard can be derived from the path metrics of the two most probable state groups.

If the delay time is not critical, then naturally delayed decisions can also be made about the group membership. If one consults the state group of FIG. 3, one finds that leading to each state U, V, W, X, only channel symbols of one channel symbol group, I or II, are ever possible. Thus in the same way at time i, one can obtain an estimated value for the channel symbol group membership at time i. The processing block 20 in FIG. 4 then accordingly contains a different table. The configuration of the state groups in FIG. 5 would also be different then.

If even longer delay times in the control loop are tolerable, then it is naturally possible, as in the method described in reference 2, first to determine an estimated value for the channel symbol at a time that is farther in the past. But in this case as well, it is appropriate to convert this decision into a group decision, for instance with a table, since by that means fewer unstable equilibrium states of the control loop can occur, and the initial synchronization is thus less problematic. Once again, a standard for the quality of the estimated value can be derived from the difference between the path metrics.

Instead of supplying the demodulator Dm with a designation for the most probable group membership, or the most probable channel symbol, with or without a quality standard, it is possible as an alternative to determine one quality standard for each possible group or each possible channel symbol and to deliver that quality standard to the demodulator Dm. The demodulator Dm can then take all the alternatives into account and can perform appropriate weighting on its own.

A convolution code with a rate of ½ in QPSK has been described only as an example, to illustrate the principle. The method can be employed equally well in the trellis-coded modulation described in reference 2, for instance with a rate of ⅔ in 8PSK or a rate of ¾ in 16PSK, and especially in the pragmatic trellis-coded modulation described in the article by Viterbi et al., "A Pragmatic Approach to Trellis-Coded Modulation", IEEE Communications Magazine, July 1989, pages 11–19. It can also be employed in matrix or block coding; in the first instance, a group division as a function of time, corresponding to the matrix pattern and periodically recurring, may be necessary.

From the above description it has become clear what the underlying principle of the invention, with its various possible embodiments, is: To shorten transit times of the support signals ($g'_i$) returned from the data decoder (Dd) to the demodulator (Dm), these signals have a limited information content, which can for instance be restricted to information that tells which one of a plurality of groups of channel symbols ($c'_i$) the transmitted channel symbols ($c'_i$) tentatively belong to, or which group of states the path through the trellis diagram is just now tentatively located in.

What is claimed is:

1. A method of reception of a coded data signal by a receiver, said receiver including a demodulator (Dm) that generates estimated symbols ($c'_i$) from said coded data signal and a data decoder (Dd), said data decoder being connected to the demodulator following the demodulator and the coded data signal being encoded by means of a state transition diagram, said state transition diagram including a number of states (U, V, W, X) of the data decoder (Dd), said method comprising the steps of:
    a) forming a number (N) of groups (a, b) from the states (U, V, W, X) of the state transition diagram;
    b) continuously making estimations of probabilities of group membership of a current state of the data decoder in said groups (a,b);
    c) furnishing said estimations of the probabilities of said group membership to the demodulator (Dm) in the form of assisting signals; and
    d) generating the estimated symbols ($c'_i$) with the help of the assisting signals.

2. The method as defined in claim 1, further comprising dividing the states (U, V, W, X) of the transmission state diagram underlying the coding into said groups (a,b) so that at least one (a) of said groups and a channel symbol ("1", "3") exists that does not come from any of said states of said at least one (a) of said groups.

3. The method as defined in claim 1, further comprising dividing the states (U, V, W, X) of the transmission state diagram underlying the coding into said groups (a,b) so that at least one (a) of said groups and a channel symbol ("1", "3") exists that does not lead to any of the states of said at least one (a) of said groups.

4. The method as defined in claim 1, further comprising performing a plurality of different group divisions and periodically using said different group divisions at different time points.

5. The method as defined in claim 1, wherein said receiver comprises means for trellis decoding.

6. The method as defined in claim 1, wherein said receiver comprises means for pragmatic trellis decoding.

7. The method as defined in claim 1, wherein said data decoder (Dd) is a Viterbi decoder.

8. The method as defined in claim 1, further comprising making a decision regarding said group membership of said current state of the date decoder (Dd) from said estimations of the probabilities and furnishing said decision to said demodulator to assist in generating said estimated symbols.

9. The method as defined in claim 8, further comprising determining a quality for said decision regarding group membership concerning a most probable state and transmitting said quality to said demodulator as an additional assisting signal.

10. The method as defined in claim 8, wherein said decision is derived from a metric of said states of said transmission state diagram underlying said coding.

11. The method as defined in claim 1, wherein said number (N) is a total number of all possible states (U, V, W, X) so that each of said groups contains exactly one of said states.

12. A method of reception of a coded data signal by the receiver, the data signal being encoded by means of a channel symbol alphabet having M stages, the receiver including a demodulator that generates estimated symbols ($c'_i$) from the coded data signal and a data decoder following the demodulator, said method comprising the steps of:
    a) forming a number (K) of groups (I, II) from channel symbols of the channel symbol alphabet, at least one of the groups comprising more than one of said channel symbols;
    b) continuously making estimations of probabilities of group membership of a received symbol ("0", "1", "2", "3");
    c) furnishing said estimations of probabilities of group membership to the demodulator in the form of assisting signals; and
    d) generating said estimated symbols ($c'_i$) with the help of the assisting signals.

13. The method as defined in claim 12, further comprising dividing the channel symbol alphabet into said groups (I, II) so that only channel symbols ("0", "1", "2", "3") of one (I or II) of said groups occur leading away from each state of a transition state diagram of said decoder under lying the coding.

14. The method as defined in claim 12, further comprising dividing the channel symbol alphabet into said groups (I, II) so that only channel symbols ("0", "1", "2", "3") of one (I or II) of said groups occur leading to each state of a transition state diagram of said decoder under lying the coding.

15. The method as defined in claim 12, further comprising making a decision regarding said group membership of said current state of the date decoder (Dd) from said estimations of the probabilities and furnishing said decision to said demodulator to assist in generating said estimated symbols.

16. The method as defined in claim 15, further comprising determining a quality for said decision regarding group membership and transmitting said quality to said demodulator as an additional assisting signal.

17. The method as defined in claim 15, wherein said decision is derived from a metric of said states of said transmission state diagram underlying said coding.

* * * * *